(12) United States Patent
Nakasako et al.

(10) Patent No.: US 6,549,832 B2
(45) Date of Patent: Apr. 15, 2003

(54) CONTROL DEVICE FOR CONTROLLING FRONT AND REAR WHEEL DRIVE VEHICLE

(75) Inventors: Tooru Nakasako, Saitama (JP); Naoki Uchiyama, Saitama (JP); Kouji Tamenori, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 2 days.

(21) Appl. No.: 09/968,808

(22) Filed: Oct. 3, 2001

(65) Prior Publication Data

US 2002/0055810 A1 May 9, 2002

(30) Foreign Application Priority Data

Nov. 8, 2000 (JP) ........................................ 2000-339894

(51) Int. Cl.[7] ................................................. B60L 11/12
(52) U.S. Cl. ....................... 701/22; 180/65.2; 180/65.3; 180/65.6
(58) Field of Search ............................... 701/22, 69, 89; 180/65.1, 65.2, 65.3, 65.4, 65.5, 65.6, 65.7, 65.8, 165

(56) References Cited

U.S. PATENT DOCUMENTS 6,209,672 B1 * 4/2001 Severinsky ................. 180/65.2
6,401,850 B1 * 6/2002 Bowen ....................... 180/65.6
2002/0058564 A1 * 5/2002 Yamamoto et al. ............ 477/3
2002/0107618 A1 * 8/2002 Deguchi et al. .............. 701/22
2002/0160874 A1 * 10/2002 Bowen et al. .............. 475/198

\* cited by examiner

Primary Examiner—Gary Chin
(74) Attorney, Agent, or Firm—Arent Fox Kintner Plotkin & Kahn PLLC (57) ABSTRACT

A control device 6 for a front and rear wheel drive vehicle wherein one of a front wheel pair and a rear wheel pair is driven with an engine 3 and the other one of the front and rear wheel pairs is driven with an electric motor 5 supplied with electric power from an electric storage means is disclosed as including a drive condition detection means for detecting a running condition of the vehicle, a road surface frictional coefficient estimating means 60 for estimating a road surface frictional coefficient, an atmospheric temperature detection means for detecting an atmospheric temperature, a temperature detection means for detecting a temperature of the electric storage means, a motor drive power calculation means 61 for calculating a drive power of the electric motor responsive to the detected running condition and the estimated road surface frictional coefficient, and a control mode changeover means 62, 63 for changing over control modes during calculation of the drive power of the electric motor responsive to the detected atmospheric temperature or/and the temperature of the electric storage means.

3 Claims, 5 Drawing Sheets

| Atmospheric Temperature | Road Surface μ-estimated value | Battery Temperature | Control Modes | Reasoning For Discrimination | Lowest Remaining Capacity Level |
|---|---|---|---|---|---|
| High | High | High | Fuel Saving Mode | High μ-road Stability | 10% |
| | | Medium | Fuel Saving Mode | High μ-road Stability | 10% |
| | Medium | High | Fuel Saving Mode | Drivable At Fuel Saving Mode | 20% |
| | | Medium | Fuel Saving Mode | Drivable At Fuel Saving Mode | 20% |
| | Low | High | Low μ-road Running Mode | Low μ-road | 30% |
| | | Medium | Low μ-road Running Mode | Low μ-road | 30% |
| Medium | High | High | Fuel Saving Mode | High μ-road Stability | 10% |
| | | Medium | Fuel Saving Mode | High μ-road Stability | 20% |
| | Medium | High | Fuel Saving Mode | Drivable At Fuel Saving Mode | 30% |
| | | Medium | Fuel Saving Mode | Drivable At Fuel Saving Mode | 40% |
| | Low | High | Low μ-road Running Mode | Low μ-road | 50% |
| | | Medium | Low μ-road Running Mode | Low μ-road | 50% |
| Low | High | High | Fuel Saving Mode | Large Probability Of High μ-road Due To Snow Removing | 50% |
| | | Medium | Fuel Saving Mode | Large Probability Of High μ-road Due To Snow Removing | 60% |
| | | Low | Forced Charging Mode (Prohibit "Assist") | Battery Temperature Increased With Forced Charging | 70% |
| | Medium | High | Low μ-road Running Mode | Low μ-road | 50% |
| | | Medium | Low μ-road Running Mode | Low μ-road | 60% |
| | | Low | Low μ-road Running Mode | Low μ-road | 70% |
| | Low | High | Low μ-road Running Mode | Low μ-road | 50% |
| | | Medium | Low μ-road Running Mode | Low μ-road | 60% |
| | | Low | Low μ-road Running Mode | Low μ-road | 70% |

62a

CONTROL DEVICE FOR CONTROLLING FRONT AND REAR WHEEL DRIVE VEHICLE

FIELD OF THE INVENTION

The present invention relates to a control device for a front and rear wheel drive vehicle and, more particularly, to a control device for a front and rear wheel drive vehicle wherein one of front and rear wheel pairs is driven with an engine and the other one of the front and rear wheel pairs is driven with an electric motor.

BACKGROUND OF THE INVENTION

In recent years, extensive research and development works have been undertaken to provide a front and rear wheel drive vehicle wherein one of front and rear wheel pairs is driven with an engine and the other one of the front and rear wheel pairs is driven with an electric motor. The front and rear wheel drive vehicle is a vehicle which serves as a hybrid vehicle having a low fuel consumption and which serves as a four-wheel drive vehicle having a running stability.

In general, the front and rear wheel drive vehicle includes a battery that stores electric power to be supplied to the electric motor, and an electric power generator that charges the battery. In a case where the electric motor, which drives the wheels, serves as the electric power generator, the electric motor regenerates a portion of the running energy of the vehicle as an electrical energy, i.e., a regenerative power which is charged into the battery. Usually, the electric motor functions to produce regenerative power during a decelerating condition of the vehicle wherein an accelerator pedal is not depressed. However, in an event that a power remaining capacity level of the battery is below a given power remaining capacity level, a forced charging operation is carried out even when the accelerator pedal is depressed. During regenerative operation of the electric motor, also, a brake force is applied to the wheels associated with the electric motor on account of its regenerative operation.

In addition, the front and rear wheel drive vehicle includes a control device which is arranged to set a drive power of the engine and a drive power of the electric motor and controls the engine and the electric motor in respective control modes. For example, the control modes involve a low $\mu$-road running mode for the sake of a running stability at a road with a low frictional coefficient (that will be hereinafter referred to as "$\mu$"), a fuel saving mode for the sake of fuel consumption and a forced charging mode to be executed when the power remaining capacity level of the battery is lowered, based on which the engine and the electric motor are controlled. More particularly, in the low $\mu$-road running mode, a drive power split is carried out in a limited range of power output to be delivered to the road from the respective wheels so as to avoid a slip. In the fuel saving mode, further, the drive power split is carried out so as to attain a high operating efficiency of the engine. In the forced charging mode, also, the drive power of the engine and the amount of electric power to be charged by the electric motor are suitably distributed within a limited range of power output produced by the engine. In this connection, the respective control modes are automatically changed over with the control device and may also be manually changed over by a vehicle driver.

SUMMARY OF THE INVENTION

However, if the lowest power remaining capacity level, which serves as a reference to discriminate the forced charging mode to be changed over, remains at a constant value regardless of the road surface conditions, there are some instances where the low fuel consumption of the hybrid motor is degraded. For example, in a case where, when the atmospheric temperature remains at a normal temperature level, the vehicle is continuously ascending the upward slope with a high $\mu$-road, since the electric motor also drives the wheels, a gradual decrease will arise in the remaining capacity level of the battery. When this occurs, the power remaining capacity level of the battery decreases to a value below the lowest power remaining capacity level, with a resultant changeover into the forced charging mode. But, in usual practice, a continuous downward slope will appear in a case where the vehicle has passed through the continuous upward slope, and the vehicle encounters a continuous descending phase after a continuous ascending movement. Accordingly, in spite of a probability in that the power remaining capacity level of the battery is expected to be increased due to the regenerative power produced during the decelerating condition of the vehicle at the continuous downward slope, the control device tends to execute the forced charging operation during the continuous ascending operation. When this occurs, since the braking force is applied to the wheels associated with the electric motor during the forced charging operation, the engine tends to operate at a lowered fuel saving efficiency to compensate for such a braking force. In a case where the low $\mu$-road is caused to appear due to snow, further, there are many instances where the low $\mu$-road will continue for a long time period. In such a case, since an electric power consumption of the electric motor will remarkably increase on account of driving the vehicle in the low $\mu$-road running mode, it is required for the power remaining capacity level of the battery to be maintained at an increased level as high as possible. In addition, the lower the battery temperature, the lower will be the performance of the battery to supply electric power. To address this issue, it is necessary for the battery to be charged and the temperature of the battery to be increased to a level as high as possible. However, the presence of the lowest power remaining capacity level of the battery maintained at the constant level regardless of the road surface conditions or the battery performance suffers a problem in that it is difficult to charge the battery at a suitable timing.

It is therefore an object of the present invention to provide a control device for a front and rear wheel drive vehicle wherein regenerative power is produced in dependence on road surface conditions and a battery performance for thereby providing an improved fuel consumption.

According to an aspect of the present invention, there is provided a control device for a front and rear wheel drive vehicle wherein one of a front wheel pair and a rear wheel pair is driven with an engine and the other one of said front wheel and rear wheel pairs is driven with an electric motor with electric power output produced by electric storage means, which comprises drive condition detection means for detecting drive conditions of said front and rear wheel drive vehicle, road surface frictional coefficient estimating means for estimating a road surface frictional coefficient, atmospheric temperature detection means for detecting an atmospheric temperature, temperature detection means for detecting a temperature of said electric storage means, motor drive power calculation means for calculating a drive power of said electric motor on the basis of the running condition detected by said drive condition detection means and the road surface frictional coefficient estimated by said road surface frictional coefficient estimating means, and control mode changeover means for changing over control modes during calculation of the drive power of said electric motor on the basis of the atmospheric temperature detected by said atmospheric temperature detection means or/and the temperature of the electric storage means detected by said temperature detection means.

With such a control device for the front and rear wheel drive vehicle, utilizing the atmospheric temperature as the parameter for changing over the control modes with the control mode changeover means makes it possible to estimate the road surface condition at a high accuracy. Further, the control device utilizes the temperature of the electric storage means as the parameter for changing over the control modes with the control mode change over means, enabling the performance of the electric storage means to be accurately estimated. In addition, the control device changes over the control modes with the control mode changeover means in dependence on the road surface condition and the battery performance, thereby remarkably improving the fuel consumption.

Also, the drive conditions of the vehicle refers to the driving conditions of the front and rear wheel drive vehicle such as the opening degree of the accelerator pedal, the vehicle speed, and the power remaining capacity level of the electric storage means, etc.

In the control device for the front and rear wheel drive vehicle, further, the drive condition detection means comprises the power remaining capacity detection means which detects the power remaining capacity level of the electric storage means, and, when the atmospheric temperature detected by the atmospheric temperature detection means is below the first given atmospheric temperature level, the control mode changeover means settles the lowest power remaining capacity level in dependence on the temperature of the electric storage means, that is detected with the electric storage means temperature detection means, for enabling the drive power of the electric motor to be limited when the power remaining capacity level, detected by the power remaining capacity detection means, is below the lowest remaining capacity level.

With the control device for the front and rear wheel drive vehicle, in a case where the atmospheric temperature remains at the low level below the first given temperature level, since it is estimated that there are many probabilities wherein the performance of the electric storage means is lowered, the lowest power remaining capacity level is allowed to be settled to the high level in dependence on the temperature of the electric storage means. With such a settlement, the electric storage means may have the increased number of frequencies for the forced charging operations and, thus, the power remaining capacity level of the electric storage means increases in dependence on the performance of the electric storage means while raising the temperature of the electric storage means.

Also, the first given atmospheric temperature refers to the low temperature in that snow falls or in that there are many instances where snow falls and, in the preferred embodiment, is exemplarily selected to be 5° C. Further, the expression "to limit the drive power of the electric motor" refers to the meaning that the operation of the electric motor is interrupted or the electric motor is caused to function as the electric power generator to enable the electric motor to charge the electric storage means.

In the control device for the front and rear wheel drive vehicle, further, the drive condition detection means includes the power remaining capacity detection means which detects the power remaining capacity level of the electric storage means, and, when the atmospheric temperature detected by the atmospheric temperature detection means exceeds the second given temperature level, the control mode changeover means settles the lowest power remaining capacity level in dependence on the road surface frictional coefficient, that is estimated by the road surface frictional coefficient estimating means, for enabling the drive power of the electric motor to be limited when the power remaining capacity level, detected by the power remaining capacity detection means, is below the lowest remaining capacity level.

With such a control device for the front and rear wheel drive vehicle, in a case where the atmospheric temperature remains at the normal temperature level above the second temperature level, since it is estimated that there is a few instances wherein the performance of the electric storage means is degraded and there is the low $\mu$-road due to snow, the lowest power remaining capacity level may be settled to the low level in dependence on the road surface $\mu$-estimated value. With such a settlement, the electric storage means may have the decreased number of frequencies for the forced charging operations, with a resultant improvement in the fuel consumption at many chances as many as possible provided that the road surface $\mu$-estimated value does not remain at the low $\mu$-value.

Also, the second given atmospheric temperature refers to the temperature in that there is surely no snow falls and, in the preferred embodiment, is exemplarily selected to be 30° C. Further, the expression "to limit the drive power of the electric motor" refers to the meaning that the operation of the electric motor is interrupted or the electric motor is caused to function as the electric power generator to enable the electric motor to charge the electric storage means.

BRIEF DESCRIPTION OF THE DRAWINGS

Preferred embodiments of the present invention will be described below, by way of example only, with reference to the accompanying drawings, in which:

FIG. 4 is a table for illustrating a control mode discriminating matrix which is used in the control mode discriminating unit shown in FIG. 2.

DESCRIPTION OF THE PREFERRED EMBODIMENTS

To describe the present invention more in detail, a preferred embodiment of a control device for a front and rear wheel drive vehicle according to the present invention will be described below in detail with reference to the drawings.

Advanced features of the control device for the front and rear wheel drive vehicle according to the present invention concern the presence of first and second parameters representative of a road surface $\mu$ and an atmospheric temperature, respectively, for changing over a control mode to more precisely estimate a road status (in particular, a road surface condition) based on which the control mode is changed over. Further, another advanced feature of the control device concerns another parameter representative of the temperature of an electric storage unit, to be combined with the first and second parameters, for enabling discrimination of a performance of the electric storage unit to allow the number of frequencies of a forced charging operation to be settled. Specifically, in an event that the atmospheric temperature is at a low level, the control device responds to the temperature of the electric storage unit and settles the lowest power remaining capacity level at a higher value such that the number of frequencies of the forced charging operation is increased for thereby improving the performance of the electric storage unit. Also, in an event that the atmospheric temperature is at high level, the control device settles the lowest power remaining capacity level to a lower value to reduce the number of frequencies of the forced charging operation for thereby improving fuel consumption.

In the illustrated embodiment of the present invention, the front and rear wheel drive vehicle to which the control device of the present invention is applied will be described with reference to a front and rear wheel drive vehicle wherein front wheels are driven with an engine and rear wheels are driven with an electric motor. In the illustrated embodiment, further, the control mode for setting a drive power level of the engine and a drive power level of the electric motor involves a fuel saving mode with a great regard for the fuel consumption, a low $\mu$-road running mode with a great regard for a running stability and a forced charging mode with a great regard for a battery charging operation. In the control device which is installed in the front and rear wheel drive vehicle, further, three control modes are changed over on the basis of a control mode discrimination matrix, for thereby setting the drive power level of the engine and the drive power level of the electric motor in dependence on respective control modes. In the control device, also, the parameters for changing over the control modes include a road surface $\mu$-estimated value, the atmospheric temperature, the temperature of a battery and a remaining capacity value of the battery.

Figure 1:
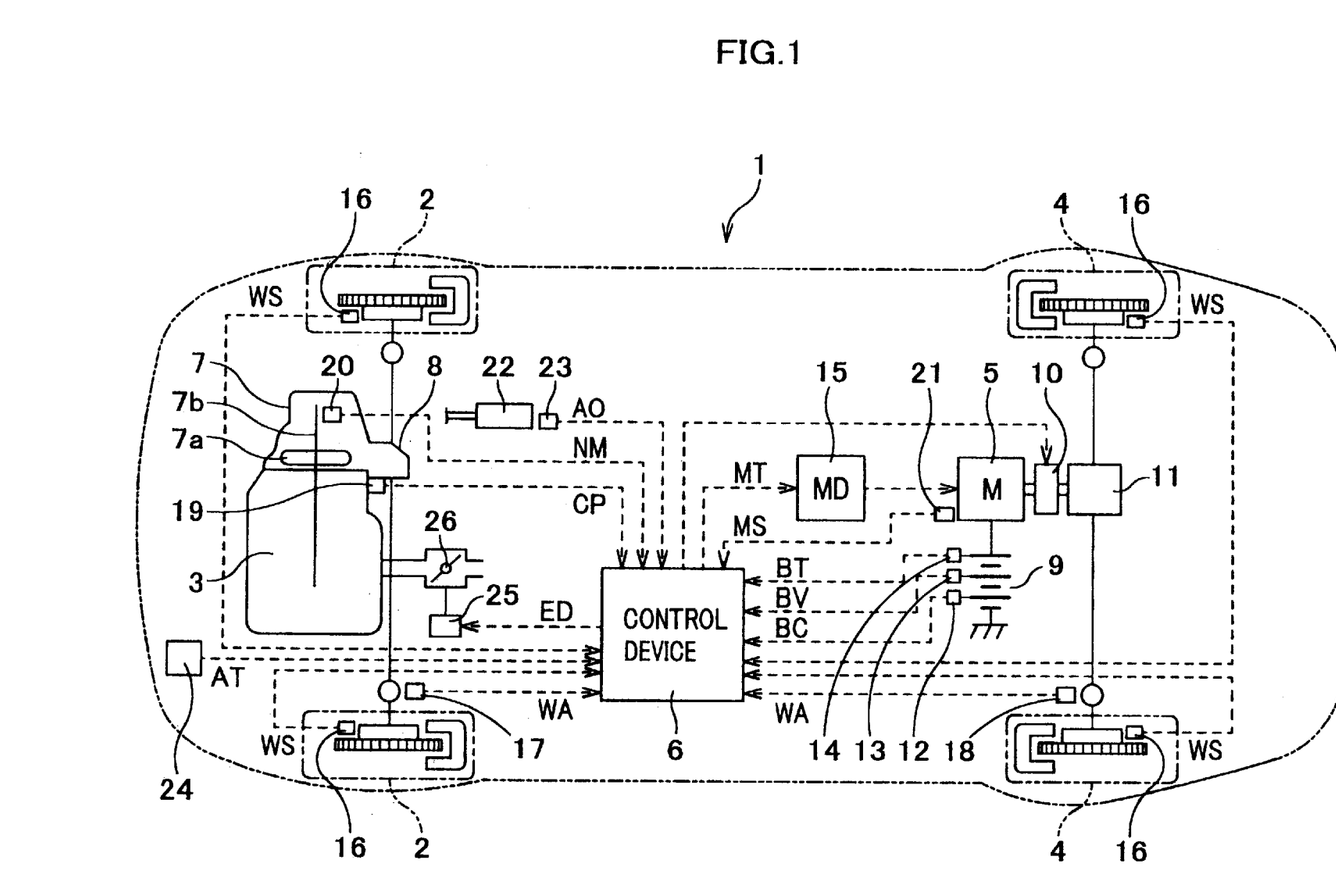
FIG. 1 is a schematic view of an overall structural view of a preferred embodiment of a front and rear wheel drive vehicle according to the present invention.

Now, a structural overview of the front and rear wheel drive vehicle 1 (hereinafter called as a vehicle) is described below in detail in conjunction with FIG. 1. FIG. 1 is an overall structural view of the front and rear wheel drive vehicle.

In the illustrated embodiment, the front and rear wheel drive vehicle 1 refers to a front and rear wheel drive vehicle defined in appended claims.

The vehicle 1 has left and right front wheels 2, 2 which are driven with an engine 3, and left and right rear wheels 4, 4 which are driven with an electric motor 5. Further, in the vehicle 1, the control device 6 controls the engine 3 and the electric motor 5.

In the illustrated embodiment, also, the front wheels 2, 2 refer to one of front and rear wheel pairs defined in the appended claims. The rear wheels 4, 4 refer to the other one of the front and rear wheel pairs defined in the appended claims. The engine 3 refers to an engine defined in the appended claims. The motor 5 refers to an electric motor defined in the appended claims, and the control device 6 refers a control device defined in the appended claims.

The engine 3 is laterally mounted on a front area of the vehicle 1. In addition, the engine 3 is coupled through an automatic power transmission 7, which includes a torque converter 7a and a main shaft 7b, and a front differential 8 to the front wheels 2, 2 to drive the same. Further, the engine 3 includes a throttle valve 26, which is connected through a DBW (Drive By Wire) driver 25 to the control device 6. Also, the drive power level of the engine 3 is set by the control device 6 and, on the basis of such drive power level, an opening degree of the throttle valve 26 is electronically controlled by the DBW driver 25. The DBW driver 25 includes an electric motor for varying the opening degree of the throttle valve 26.

The electric motor 5 is mounted on a rear area of the vehicle 1. Further, the electric motor 5 is connected to a battery 9 which serves as a power supply. In addition, the electric motor 5 is coupled through an electromagnetic clutch 10 and a rear differential 11 to the rear wheels 4, 4 to drive the same. Also, the electric motor 5 is supplied with an electric power output of the battery 9 and, in a case where the electromagnetic clutch 10 remains in a coupled state, the rear wheels 4, 4 are driven to maintain the vehicle 1 in a four-wheel drive state. In this connection, an output power of the electric motor 5 remains in the maximum power range of for example 12 kW. On one hand, in an event that the electric motor 5 is driven with a running energy of the vehicle 1, the motor 5 functions as an electric power generator to recapture a regenerative power. Further, a current sensor 12 and a voltage sensor 13 are provided in the battery 9 to detect these parameters for producing a battery current signal BC and a battery voltage signal BV, respectively, which are introduced to the control device 6. In this connection, the battery current signal BC and the battery voltage signal BV are used in the control device to calculate a power remaining capacity level SOC of the battery 9. Also, a battery temperature sensor 14 is provided in the battery 9 to detect the operating temperature thereof for producing a battery temperature signal BT which is applied to the control device 6. Further, the battery temperature sensor 14 is a temperature sensor made of a thermistor.

In the illustrated embodiment, furthermore, the battery 9 refers to an electric storage means defined in the appended claims. The current sensor 12 and the voltage sensor 13 refer to a power-remaining capacity detection means and a drive condition detection means, respectively, in the appended claims. The battery temperature sensor 14 refers to a temperature detection means for an electric storage means.

Further, the electric motor 5 is coupled through a motor driver 15 to the control device 6. In addition, the control device 6 sets the drive power level of the electric motor 5 required during the four-wheel driving state and the electric power output level (negative drive power level) of the electric motor 5 during the regenerative power generating mode, based on which the motor driver 15 controls the electric motor 5. The motor driver 15 serves as a control device for the electric motor 5 to perform control for electric current level, etc., of the electric motor 5. Furthermore, the coupling or uncoupling states of the electromagnetic clutch 10 are discriminated with the control device 6, which then controls supply or interruption of the supply of electric current to be supplied to a solenoid (not shown) of the electromagnetic clutch 10.

Wheel sensors 16 each of a magnetic flux pick-up type are provided at the left and right front wheels 2, 2 and the left and right rear wheels 4, 4, respectively, to detect respective rotational speeds (hereinafter referred to as "RPM") for producing respective wheel's rotational speed signals (RPM signals) WS, each representing a train of pulse signals indicative of RPM, to be introduced to the control device 6. Further, acceleration sensors 17, 18 are provided at one of the left and right front wheels 2, 2 and at one of the left and right rear wheels 4, 4, respectively, to detect respective acceleration degrees of the front wheels 2, 2 and the rear wheels 4, 4 for producing acceleration signals WA which are introduced to the control device 6. Also, the acceleration sensors 17, 18 are composed of fore and aft G sensors (of a magnetostrictor type), respectively, for detecting acceleration levels in fore and aft directions of the vehicle such that the acceleration signals WA indicative of accelerations in the fore and aft directions of the vehicle detected by the acceleration sensors may be introduced to the control device 6 in order to accurately obtain the vehicle speed. In addition, the control device 6 calculates a wheel's speed in response to the wheel's RPM signals WS and also calculates a vehicle speed on the basis of the wheel's RPM signals WS and the acceleration signals WA.

In the illustrated embodiment, further, the wheel sensors 16 refer to a drive condition detection means defined in the appended claims and the acceleration sensors 17, 18 refer to the drive condition detection means defined in the appended claims.

A crank angle sensor 19 is also mounted to a crankshaft (not shown) of the engine 3 to detect a crank angular position of the crankshaft to produce a crank pulse signal CP representative of a crank angle which is applied to the control device 6. Further, a main shaft RPM sensor 20 of a magnetic pick-up type is mounted to the automatic power transmission 7 to detect a rotational speed of the main shaft 7b for producing a main shaft RPM signal NM, composed of a train of pulse signal indicative of the RPM of the main shaft 7b, which is introduced to the control device 6. Upon receiving crank pulse signal CP, the control device 6 calculates an engine RPM signal NE. Further, the control device 6 calculates a slip ratio=NM/NE of the torque converter 7a on the basis of the main shaft RPM signal NM and the engine RPM signal NE.

In addition, a motor RPM sensor 21 is mounted to the electric motor 15 of a resolver type is mounted to the electric motor 5 to detect a RPM value of the electric motor 5 for producing a motor RPM signal MS, composed of a train of pulse signal representative of the RPM value of the electric motor 5, which is applied to the control device 6.

Further, an accelerator opening sensor 23 is coupled to an accelerator pedal 22 to detect an accelerator's displacement opening degree for producing an accelerator opening signal A0, composed of a train of pulse signals inclusive of ON/OFF states of the accelerator pedal 22, which is applied to the control device 6.

In this connection, the accelerator opening sensor 23 refers to the drive condition detection means defined in the appended claims.

Furthermore, an atmospheric sensor 24 is mounted on the vehicle to detect the temperature of the atmosphere for producing an atmospheric temperature signal AT which is applied to the control device 6. The atmospheric temperature sensor 24 includes a temperature sensor composed of a thermistor.

In the illustrated embodiment, further, the atmospheric temperature sensor 24 refers as atmospheric temperature detection means as defined in the appended claims.

The control device 6 is constructed of a microcomputer (not shown) composed of a RAM (Random Access Memory), a ROM (Read Only Memory), a CPU (Central Processing Unit) and I/O Interfaces, etc. The control device 6 sets a target drive power level on the basis of the accelerator opening degree and the vehicle speed. Also, the control device 6 determines the control mode according to a control mode discrimination matrix table 62a, shown in FIG. 4, on the basis of the detected values of the various sensors. Consecutively, the control device 6 sets the drive power level of the engine 3 and the drive power level of the electric motor 5 on the basis of the various control modes and sets an engine drive signal ED on the basis of the drive power level of the engine 3 and a motor demanded torque signal MT on the basis of the drive power level of the motor 5. Also, the drive power level of the electric motor 5 represents a negative value when the electric motor 5 serves as the electric power generator. In addition, the control device 6 outputs the engine drive signals ED to the DBW driver 25 for controlling the throttle opening of the throttle valve 26 to thereby control the drive power level of the engine 3. Further, the control device 6 outputs the motor demanded torque signal MT to the motor driver 15 to thereby control the drive power level of the electric motor 5.

Figure 2:
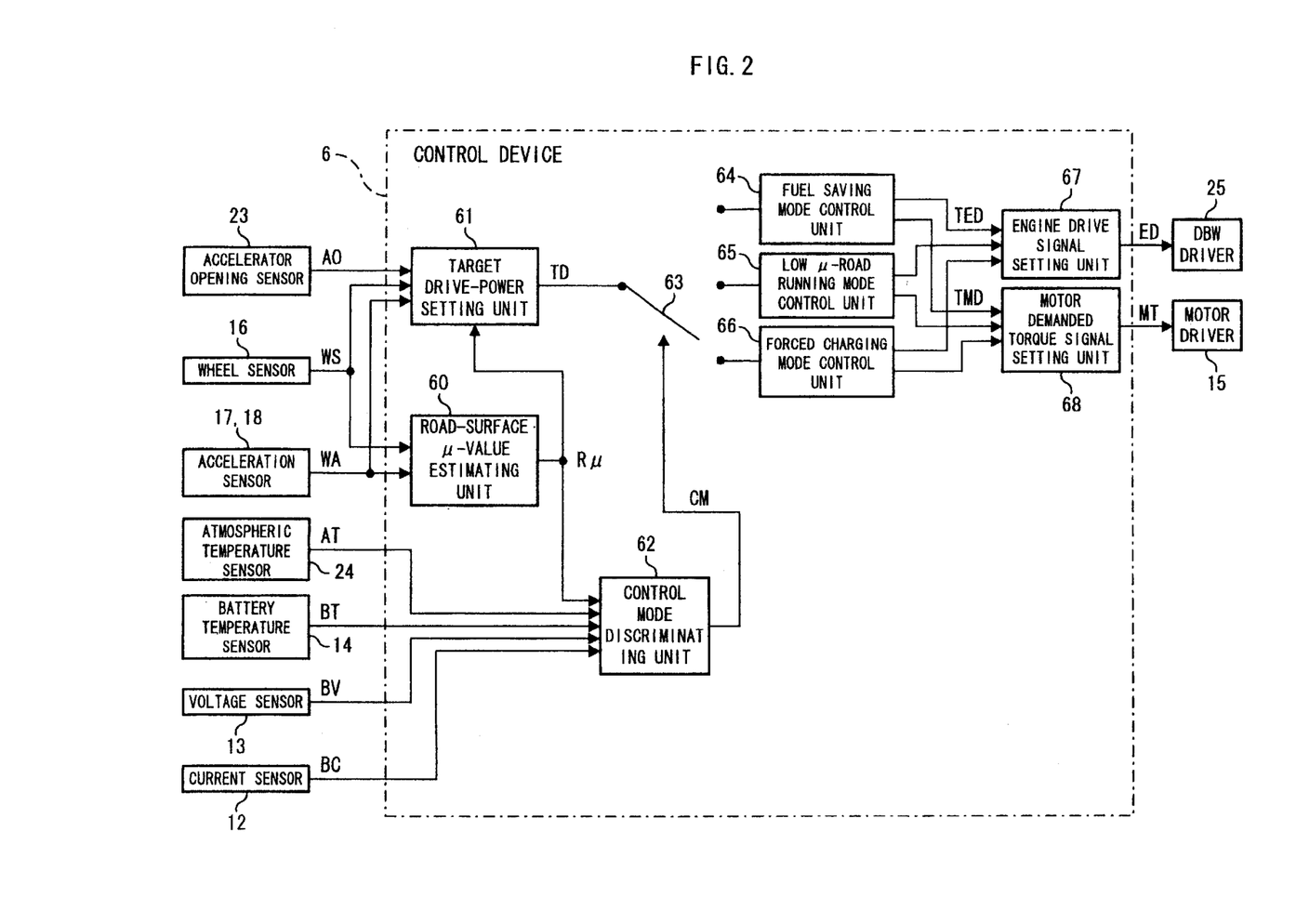
FIG. 2 is a block diagram of a control device of the front and rear wheel drive vehicle shown in FIG. 1.

Now, the structure of the control device 6 is described with reference to FIG. 2, which shows the structural view of the control device of the front and rear wheel drive vehicle.

The control device 6 includes a road surface $\mu$-value estimating unit 60, a target drive power setting unit 61, a control mode discriminating unit 62, a control mode changeover unit 63, a fuel saving mode control unit 64, a low $\mu$-road running mode control unit 65, a forced charging mode control unit 66, an engine drive signal setting unit 67 and a motor demanded torque signal setting unit 68.

In the illustrated embodiment, also, the road surface $\mu$-value estimating unit 60 refers to a road surface frictional coefficient estimating means defined in the appended claims. The target drive power setting unit 61, the fuel saving mode control unit 64, the low $\mu$-road running mode control unit 65 and the forced charging mode control unit 66 refer a motor drive power calculating means defined in the appended claims. The control mode discriminating unit 62 and the control mode changeover unit 63 refer a control mode changeover means defined in the appended claims.

The road $\mu$-value estimating unit 60 is applied with the wheel's RPM signal WS output from the wheel sensors 16 and the acceleration signal WA output from the acceleration sensors 17, 18 for outputting a road surface $\mu$-estimated value R$\mu$ to the target drive power setting unit 61 and the control mode discriminating unit 62. The road surface $\mu$-value estimating unit 60 calculates the wheel's speeds of the respective wheels 2, 2, 4, 4, on the basis of the wheel RPM signal WS. Further, the road surface $\mu$-value estimating unit 60 calculates the vehicle speed of the vehicle 1 on the basis of the past history of the vehicle speed, the wheel speeds and the acceleration signal WA. Also, the road surface $\mu$-value estimating unit 60 calculates respective slip ratios of the wheels 2, 2, 4, 4 on the basis of the wheel's speeds of the respective wheels and the vehicle speed. Finally, the road surface $\mu$-value estimating unit 60 calculates the road surface $\mu$-estimated value R$\mu$ on the basis of the slip ratios of the respective wheels 2, 2, 4, 4.

The target drive power setting unit 61 is applied with the 20 wheel RPM signal WS output from the wheel sensors 16, the acceleration signal Wa output from the acceleration sensors 17, 18, the accelerator opening signal AO output from the accelerator opening sensor 23 and the road surface µ-value estimated value Rµ output from the road surface µ-estimating unit 60, for outputting a target drive power TD to the fuel consumption control unit 64, the low µ-road running mode control unit 65 or the forced charging mode control unit 66 through the control mode changeover unit 63. In this connection, the target drive power TD represents the drive power level, demanded by the vehicle 1, which is the sum of the drive power levels to be produced by the engine 3 and the electric motor 5. That is, in an event that the electric motor 5 functions as the electric power generator, the target drive power TD is wholly produced with the engine 3. When this occurs, further, the running energy to be consumed with the electric motor 5 is generated with the engine 3.

In addition, the target drive power setting unit 61 calculates the vehicle speed in the same manner as done in the road surface µ-value estimating unit 60. Also, the target drive power setting unit 61 may not serve to calculate the vehicle speed and may utilize the vehicle speed that has been calculated by the road surface µ-value estimating unit 60. Further, the target drive power setting unit 61 includes a memory means such as ROM for storing a table involving the vehicle speed, which has been set on the basis of preliminary experimental results or designed results, and the accelerator opening signal AO relative to the target drive power TD. Also, the table involves the target drive power TD that increases as the accelerator opening increases and decreases as the vehicle speed increases. In addition, the target drive power setting unit 61 reads out the target drive power TD addressed in terms of the vehicle speed and the accelerator opening signal AO for outputting the target drive power TD to the control mode changeover unit 63. In an event that the vehicle 1 remains in a slipping condition, also, the target drive power setting unit 61 calculates a drive power, to be transmitted to the road surface during the slipping condition, on the basis of the total weight of the vehicle 1 and the road surface µ-estimated value Rµ, with such a drive power being assigned as the target drive power TD. In this connection, the target drive setting unit 61 discriminates whether the vehicle 1 remains in the slipping condition on the basis of the slip ratios of the respective wheels 2, 2, 4, 4 calculated by the road surface µ-value estimating unit 60.

The control mode discriminating unit 62 is applied with the battery current signal BC output from the current sensor 12, the battery voltage signal BV output from the voltage sensor 13, the battery temperature signal BT output from the battery temperature sensor 14, the atmospheric temperature signal AT output from the atmospheric temperature sensor 24 and the road surface µ-estimated value Rµ output from the road surface µ-value estimating unit 60 for outputting the control mode signals CM to the control mode changeover unit 63. To this end, the control mode discriminating unit 62 includes a memory means such as ROM etc. for storing the table involving the control mode discriminating matrix 62a which is preset on the basis of preliminary experimental results or designed results as shown in FIG. 4. Further, the control mode discriminating unit 62 discriminates either one of control modes such as the fuel consumption mode, the low µ-road running mode and the forced charging mode according to the table on the basis of the battery voltage signal BV, the battery temperature signal BT, the atmospheric temperature signal AT and the road surface µ-value estimated value Rµ. Also, the control mode discriminating matrix 62a is composed of a matrix which enables discrimination of the either one of the control modes composed of the fuel saving mode, the low µ-road running mode and the forced charging mode in terms of parameters composed of the remaining capacity level of the battery, the atmospheric temperature, the road surface µ-estimated value and the battery temperature. In addition, the control mode discriminating unit 62 calculates the power remaining capacity level SOC of the battery on the basis of the battery current signal BC and the battery voltage signal BV. The power remaining capacity level SOC of the battery is designated as the rate (ranging from 0 to 100%) of electric power charged in the battery 9 relative to the capacity of electric power to be chargeable in the battery 9.

In this connection, the control mode matrix 62a is able to discriminate whether the forced charging mode exists on the basis of the lowest remaining capacity value of the battery. Further, the lowest remaining capacity value of the battery is preset on the basis of the atmospheric temperature range, the road surface µ-estimated value range and the battery temperature range. Further, in an event that the power remaining capacity level SOC of the battery is above the lowest remaining capacity value, the control mode discriminating matrix 62a discriminates either one of the control modes composed of the fuel saving mode, the road surface µ-road running mode and the forced charging mode on the basis of the atmospheric temperature range, the road surface µ-estimated value range and the battery temperature range. In this connection, the parameters for changing over the control modes involve, in addition to the road surface µ-estimated value conventionally used in the prior art, the atmospheric temperature and the battery temperature. That is, the atmospheric temperature serves as an important parameter to estimate a season and also serves as a parameter to estimate whether the low value of the road surface µ-estimated value depends on snow or iced road surface. Accordingly, the presence of combined atmospheric temperature and the road surface µ-estimated value makes it possible to estimate the most important road surface condition in the road status in a more accurate manner than done in the prior art practice. On the other hand, the battery temperature serves as an important parameter for estimating the performance of the battery 9. In this connection, as the battery temperature decreases, the reaction of the battery 9 is lowered to degrade the performance of the battery for supplying electric power output and, thus, it is needed to raise the battery temperature by charging the battery 9.

Figure 5:
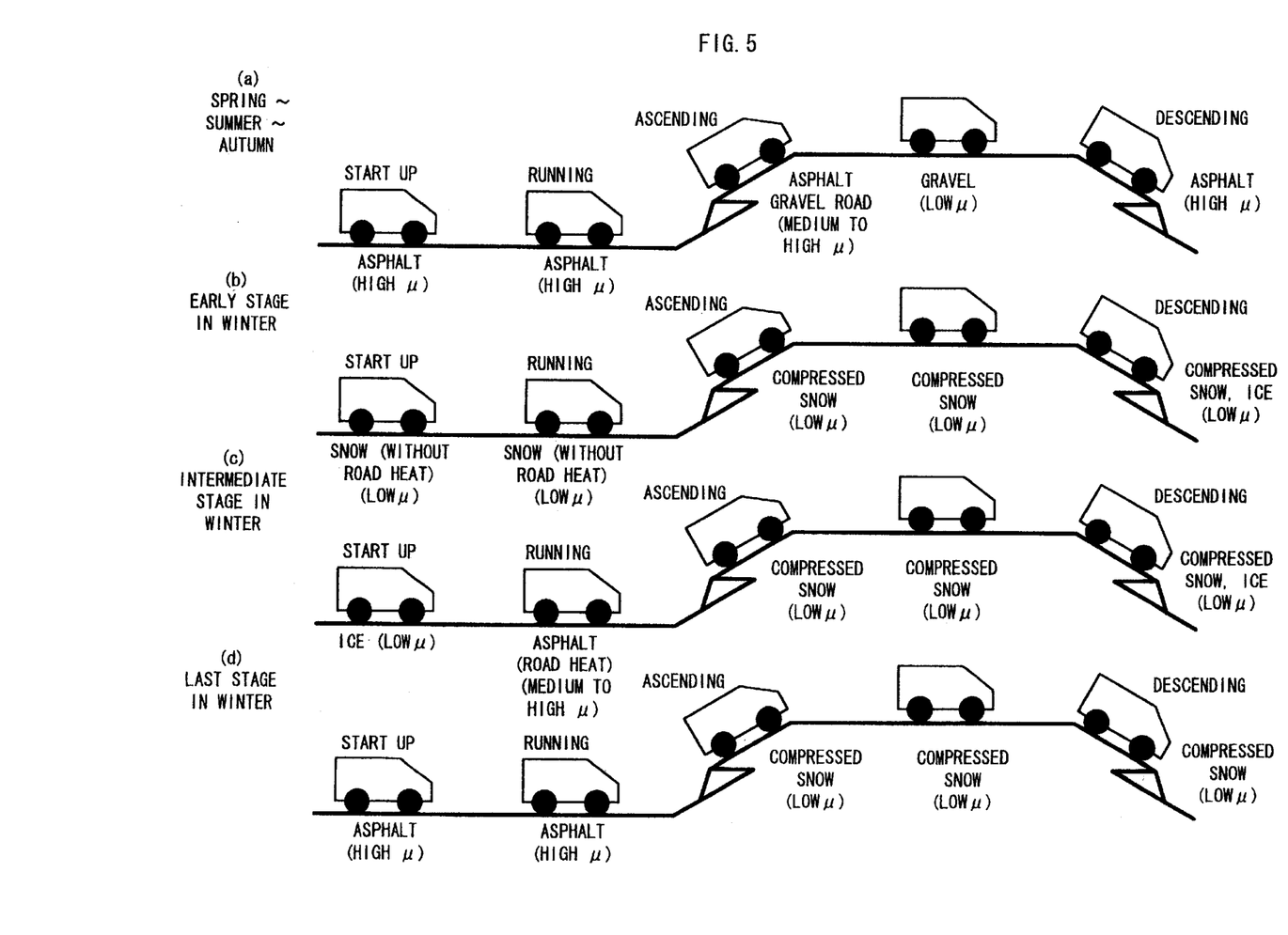
FIG. 5 is a schematic view illustrating examples of patterns of road surface conditions varying in dependence on seasons at a cold area, wherein (a) is a view showing a pattern of the road surface conditions in seasons from spring to winter, (b) is a view showing a pattern of the road surface conditions in the season at an early stage of winter, (c) is a view showing a pattern of the road surface conditions in the season at a middle stage of winter and (d) is a view showing a pattern of the road surface conditions in the season at a last stage of winter.

In order to more clearly understand the relationship between the atmospheric temperature and the road surface µ-estimated value in terms of the road surface condition, a detailed description will be given to a particular pattern of the road surface condition at a cold area in terms of the season with reference to FIG. 5. In particular, (a) shows an example of a road surface condition pattern starting from a spring to an autumn, (b) shows an example of a road surface condition pattern appearing in an early stage of a winter, (c) shows an example of a road surface condition pattern appearing in an intermediate stage of the winter, and (d) shows an example of a road surface condition pattern appearing in the last stage of the winter.

More specifically, (a) shows the road surface condition during a time period wherein there is no snow in the season starting from the spring to the summer and from the summer to the autumn. In such a season, the atmospheric temperature varies between a medium temperature level and a high temperature level and there is no instances where the road surface involves snow or iced surfaces to provide a low µ-road. Consequently, during such a season, the presence of the high µ-road is estimated to have the road surface condition of an asphalt road. Likewise, the presence of the medium μ-road is estimated to have the road surface condition of the asphalt road or a gravel road, and the presence of the low μ-road is estimated to have the road surface condition of the gravel road or a river beach etc.

(b) shows the road surface condition during an early stage of winter season wherein it begins to snow. During such a season, the atmospheric temperature remains at a low level, and the presence of the low μ-road is estimated to be based on the road surface conditions of the snow roads involving a situation that the snow begins to lie on the flat road, a situation that a large amount of snow stays and there is a compressed-snow road at an upward slope in a high ground, etc., and a situation that a downward slope at the high ground includes not only the compressed-snow road, but also an iced road.

(C) shows the road surface condition during an intermediate stage of winter season wherein there is a heavy snowfall. During such a season, the atmospheric temperature remains at an extremely low level, and the low μ-road is estimated to be based on snow roads. However, in the flat road surface, there are some instances where the asphalt road appears due to a road heating condition, etc. Accordingly, in such a season, the flat road surface undergoes the low μ-road which may be estimated to be based on the iced road and the high μ-road which may be estimated to be based on the asphalt road where the snow is removed. In such a season, also, the high ground may involve the upward slope wherein there is the compressed-snow road due to increase in the amount of snowfall and the downward slope which includes not only the compressed-snow road, but also the iced road.

(d) shows the road surface conditions during the season where, during the last stage of the winter, there is no snow at the flat road. During such a season, the atmospheric temperature varies from the low level to the medium level (at the flat road), and there are some instances where the road surface conditions include the low μ-road at the high ground and the high μ-road at the flat road due to no presence of the snow. Consequently, during such a season, it is possible to estimate that the presence of the high μ-road at the flat road represents the asphalt road which is not due to the snow removing operation. Also, during such a season, it is possible to estimate that at the high ground there is a compressed snow road due to the long-term snow stay in an area covering the upward slope and the downward slope.

Now, the control mode discriminating matrix 62a is described below in detail in conjunction with FIG. 4. In this respect, FIG. 4 shows the control mode matrix. In this connection, the control mode discriminating matrix 62a involves the atmospheric temperature with the high temperature level referring a value of above 30° C., the medium temperature level referring a value between 5° C. and 30° C., and the low temperature level referring to a value below 5° C. Further, the road surface μ-estimated values involve the high μ-value referring to a value above 0.8, the medium μ-value referring to a value between 0.5 and 0.8, and the low μ-value referring to a value below 0.5. Also, the battery temperatures involve the thigh temperature level referring to a value above 40° C., the medium temperature level referring to a value between 0° C. and 40° C., and the low temperature level referring to a value below 0° C.

First, a technical concept for setting the lowest power remaining capacity value in the control mode discriminating matrix 62a will be described below in detail. The setting of the lowest power remaining capacity value is carried out based on the atmospheric temperature and the road surface μ-estimated value. Principally, it is assumed that as the atmospheric temperature decreases, the performance of the battery 9 for supplying power output is lowered, and, to compensate this phenomenon, the lowest power remaining capacity value is settled to a high value (to increase the number of frequencies of the forced charging of the battery) to ensure the performance of the battery 9 by charging the same before the performance of the battery 9 is lowered. Further, it is assumed that as the atmospheric temperature increases, the vehicle is enabled to run in a stable mode at the high μ-road, and, hence, the lowest power remaining capacity value is settled to a low value (to decrease the number of frequencies of the forced charging of the battery) to reduce the fuel consumption at a level as low as possible. On the other hand, in an event that the atmospheric temperature remains at a level at which snow falls (at the low temperature level), the presence of the low road surface μ-estimated value is estimated to be the low μ-road due to the snow road. In this instance, the low μ-road continues for a long time period owing to the snow road and, therefore, the lowest power remaining capacity level is settled to a high level to compensate for an increase in electric power to be consumed by the electric motor 5 at the low μ-road. Further, in an event that the atmospheric temperature remains at a level at which snow falls (at the low temperature level), even in the presence of the high road surface μ-estimated value, it is estimated to be the high μ-road due to the removal of the snow from the road. In this instance, it is possible to predict that, in the near future, the road surface μ-estimated value becomes the low μ-road due to the snow fall and, therefore, the lowest power remaining capacity value is settled to a high level to compensate for an increase in electric power to be consumed by the electric motor 5 at the low μ-road. Thus, in a case where the atmospheric temperature remains at the snow falling temperature (at the low temperature level), since it is possible to estimate that there are many instances where the performance of the battery 9 is lowered, the lowest power remaining capacity value is settled to a level as high as possible in dependence on the battery temperature regardless of the road surface μ-estimated value, thereby ensuring the performance of the battery 9.

Also, the setting of the lowest power remaining capacity is implemented on the basis of the battery temperature. Principally, as the battery temperature is lowered, the performance of the battery 9 for supplying power output decreases, and, therefore, the lowest power remaining capacity value is settled to a high level (to increase the number of frequencies of the forced charging of the battery) for charging the battery 9 to increase the battery temperature. Further, as the battery temperature increases, the performance of the battery 9 for supplying power output increases and, therefore, the lowest power remaining capacity value is settled to a low level (to reduce the number of frequencies of the forced charging of the battery), thereby improving the fuel consumption at a level as low as possible.

Next, a technical concept for judging the control mode in dependence on the atmospheric temperature, the road surface μ-estimated value and the battery temperature will be described below in detail. The higher the atmospheric temperature, the less will be the number of results affected with the snow and, so, a serious consideration is undertaken for the fuel consumption. In contrast, the lower the atmospheric temperature, the more will be the serious consideration for the running stability taking the influence of the snow into consideration. Further, the higher the road surface μ-estimated value, the more will be the running stability and, in this event, the serious consideration is undertaken for the fuel consumption. On the contrary, the lower the road surface μ-estimated value, the lower the running stability and, in this event, the serious consideration is undertaken for the running stability. Also, even when the atmospheric temperature is low and the road surface μ-estimated value is at high level, the presence of the lowered battery temperature leads to the forced charging mode for raising the battery temperature by way of precaution against prospective snow road in the near future.

Now, the control mode discriminating matrix 62a is described below in detail.

In an event that the atmospheric temperature is at high level and the road surface μ-estimated value remains at the high μ-value, it is possible to estimate a capability of continuously performing a stable running of the vehicle at the high μ-road, thereby allowing the control mode to be selected into the fuel consumption mode regardless of the battery temperature. Further, the lowest power remaining capacity value is settled to the lowest value of 10% that of the maximum charge level, thereby minimizing the number of frequencies of the forced charging operations. In an event that the atmospheric temperature is at high level and the road surface μ-estimated value remains at the medium μ-value, it is possible to estimate the absence of the snow road to enable the vehicle to run in the fuel consumption mode, thereby allowing the control mode to be selected into the fuel consumption mode regardless of the battery temperature. Further, the lowest power remaining capacity value is settled to the lowest value of 20% that of the maximum charge level, thereby minimizing the number of frequencies of the forced charging operations. In an event that the atmospheric temperature is at high level and the road surface μ-estimated value remains at the low μ-value, it is possible to estimate the presence of an instable running at the low μ-road such as the gravel road, thereby allowing the control mode to be selected into the low μ-road running mode regardless of the battery temperature. Further, since the gravel road does not continue for a long time period, the lowest power remaining capacity value is settled to the lowest value of 30% that of the maximum charge level, thereby minimizing the number of frequencies of the forced charging operations.

In an event that the atmospheric temperature is at medium level and the road surface μ-estimated value remains at the high μ-value, it is possible to estimate the presence of a capability of continuously performing a stable running at the high μ-road, thereby allowing the control mode to be selected into the fuel consumption mode regardless of the battery temperature. Further, the lowest power remaining capacity value is settled to the lowest value of 10% when the battery temperature is at high level and the value of 20% when the battery temperature is at the medium level, thereby minimizing the number of frequencies of the forced charging operations. In an event that the atmospheric temperature is at medium level and the road surface μ-estimated value remains at the medium μ-value, it is possible to estimate the absence of the snow road to enable the vehicle to run in the fuel consumption mode, allowing the control mode to be selected into the fuel consumption mode regardless of the battery temperature. Further, the lowest power remaining capacity value is settled to the value of 30% when the battery temperature is at high level and 40% when the battery temperature is at medium level, thereby slightly increasing the number of frequencies of the forced charging operations. In an event that the atmospheric temperature is at medium level and the road surface μ-estimated value remains at the low μ-value, it is possible to estimate the presence of an instable running at the low μ-road such as the gravel road, thereby allowing the control mode to be selected into the low μ-road running mode regardless of the battery temperature. In this instance, the lowest power remaining capacity value is settled to the value of 50% that of the maximum charge level, thereby increasing the number of frequencies of the forced charging operations.

In an event that the atmospheric temperature is at low level and the road surface μ-estimated value remains at the high μ-value, it is possible to estimate the presence of a capability of performing a stable running at the high μ-road by removing snow, thereby allowing the control mode to be selected into the fuel consumption mode regardless of the battery temperature. However, even when the atmospheric temperature is at low level and the road surface μ-estimated value remains at the high μ-value, the presence of the battery temperature remaining at the low level has many instances where the vehicle runs on the snow road in the future and, in this instance, the control mode is selected into the forced charging mode to maintain the battery temperature at the raised level. Further, in order to raise the battery performance, the lowest power remaining capacity level is settled to the lowest value of 50% when the battery temperature is at high level, the value of 60% when the battery temperature is at the medium level and the value of 70% when the battery temperature remains at low level, thereby increasing the number of frequencies of the forced charging operations. In an event that the atmospheric temperature is at low level and the road surface μ-estimated value remains at the low μ-value, it is possible to estimate the presence of the prospective instable running at the low μ-road to be caused by the snow road in the near future, allowing the control mode to be selected into the low μ-road running mode regardless of the battery temperature. Further, in order to raise the battery performance, the lowest power remaining capacity value is settled to the value of 50% when the battery temperature is at high level, the value of 60% when the battery temperature is at medium level and the value of 70% when the battery temperature remains at low level, thereby increasing the number of frequencies of the forced charging operations. In an event that the atmospheric temperature is at low level and the road surface μ-estimated value remains at the low μ-value, it is possible to estimate the presence of the instable running at the low μ-road caused by the snow road, thereby allowing the control mode to be selected into the low μ-road running mode regardless of the battery temperature. Also, in order to raise the battery performance, the lowest power remaining capacity value is settled to the value of 50% when the battery temperature is at high level, the value of 60% when the battery temperature is at medium level and the value of 70% when the battery temperature remains at low level, thereby increasing the number of frequencies of the forced charging operations.

The control mode changeover unit 63 is applied with the target drive power TD from the target drive power setting unit 61 and the control mode CM from the control mode discriminating unit 62, and allows the target drive power TD to be applied to selected one of the control units 64, 65, 66. The control mode changeover unit 63 is responsive to the control mode CM and changes over to either one of the fuel saving mode control unit 64, the low μ-road running control mode 65 and the forced charging mode control unit 66. Thus, the target drive power TD is allowed to be applied to the selected one of the control units 64, 65, 66.

The fuel saving mode control unit 64 is applied with the target drive power TD through the control mode changeover unit 63, and outputs the engine drive power TED to an engine drive signal setting unit 67 and the motor drive power TMD to a motor's demanded torque signal setting unit 68. The fuel saving mode control unit 64 includes a memory means such as ROM for storing the target drive power TD, preset on the basis of the preliminary experimental test results or the designed results, the vehicle speed, and a table representative of a drive power split ratio that is determined to maintain the fuel consuming efficiency at a high level. Also, the vehicle speed is derived from the road surface $\mu$-value estimating unit 60. Further, the fuel saving mode control unit 64 reads out the drive power split ratio corresponding to the address in terms of the target drive power TD and the vehicle speed. In addition, the fuel saving mode control unit 64 calculates the engine drive power TED and the motor drive power TMD on the basis of the read-out drive power split ratio and the target drive power TD.

Also, in a low efficiency area of the fuel consuming efficiency of the engine 3, the fuel saving mode allows the electric motor 5 to be driven to assist the mechanical power output, thereby facilitating fuel saving. Especially during start-up of the vehicle at the low accelerator opening degree which renders the fuel saving efficiency of the engine 3 to have the lowest value, the drive power split ratio of the electric motor 5 is determined to have a value of 100% with a view to maintaining the engine at an idling stop condition or operating the engine 3 under an idling neutral condition to thereby start up the vehicle with only the electric motor 5.

The low $\mu$-road running mode control unit 65 is applied with the target drive power TD from the target drive power setting unit 61 via the control mode changeover unit 63 and outputs the engine drive power TED and the motor drive power TMD which are applied to the engine drive signal setting unit 67 and the motor demanded torque signal setting unit 68, respectively. The low $\mu$-road running control unit 65 includes a memory means such as ROM which stores a table involving the road surface $\mu$-estimated value R$\mu$, the target drive power TD and the vehicle speed, which are set on the basis of the preliminary experimental tests or the designed values, and the drive power split ratio which is settled so as not to exceed a limited value of the drive power for the front and rear wheels 2, 2, 4, 4. Further, The road surface $\mu$-estimated value R $\mu$ and the vehicle speed are calculated by the road surface $\mu$-estimating unit 60. In addition, the low $\mu$-road running mode control unit 65 reads out the drive power split ratio corresponding to addresses in terms of the road surface $\mu$-estimated value R$\mu$, the target drive power TD and the vehicle speed. Further, the low $\mu$-road running mode control unit 65 calculates the engine drive power TED and the motor drive power TMD on the basis of the read-out drive power split ratio and target drive power TD.

The low $\mu$-road running mode allows the electric motor 5 to assist the four-wheel drive running of the vehicle for thereby improving the running stability of the vehicle at the low $\mu$-road. In such a low $\mu$-road running mode, there are some instances where the drive power to be transmitted during slippage of the vehicle is settled as the target drive power TD.

The forced charging mode control unit 66 is applied with the target drive power TD from the target drive power setting unit 61 via the control mode changeover unit 63 and outputs the engine drive power TED and the motor drive power TMD which are applied to the engine drive power signal setting unit 67 and the motor demanded torque signal setting unit 68, respectively. The forced charging mode control unit 66 calculates a target charging capacity level of the battery 9 on the basis of the battery power remaining capacity level SOC etc. In this respect, the battery power remaining capacity level SOC is calculated by the control mode discriminating unit 62. In addition, the forced charging mode control unit 66 calculates the motor drive power TMD, as a negative value, from the target charging capacity level of the battery 9 because the electric motor 5 consumes the running energy in a case where the electric motor 5 serves as the electric power generator. Further, the forced charging mode control unit 66 functions to add an absolute value of the motor drive power TMD to the target drive power TD, with the added value being set to the engine drive power TED.

Also, in the forced charging mode, the engine 3 bears the running energy to be consumed by the electric motor 5 and, even when the fuel consuming efficiency remains at a low efficiency range, the engine 3 needs to be operated, resulting in a deterioration in the fuel consumption.

The engine drive signal setting unit 67 is applied with the engine drive power TED from the respective mode control units 64, 65, 66 and outputs an engine drive signal ED which is applied to the DBW driver 25. The engine drive signal setting unit 67 calculates the opening degree of the throttle valve 26 on the basis of the engine drive power TED. Further, the engine drive signal setting unit 67 responds to such a calculated result of the opening degree and sets the RPM and the rotational direction of the electric motor for the DWB driver 25 for producing the engine drive signal ED.

The motor demanded torque signal setting unit 68 is applied with the motor drive power signals TMD from the respective mode control units 64, 65, 66 and outputs a motor demanded torque signal MT which is applied to the motor driver 15. The motor demanded torque signal setting unit 68 settles the RMP and the rotational direction of the electric motor 5 on the basis of the motor drive power signals TMD. In addition, the motor demanded torque signal setting unit 68 settles a motor demanded torque signal MT on the basis of the RPM and the rotational direction of the electric motor 5 for controlling the motor driver 15.

Figure 3:
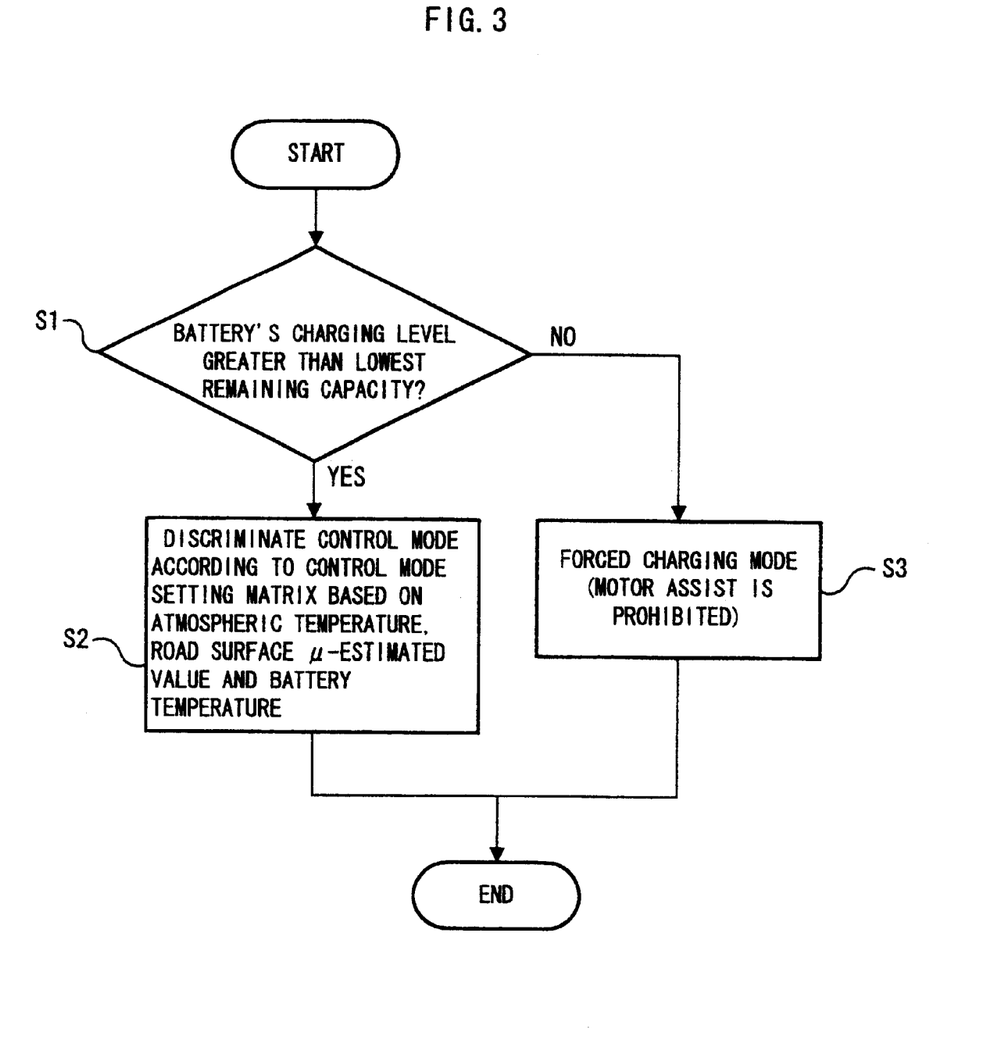
FIG. 3 is a flow diagram of a sequence of operational steps to execute discrimination in a control mode discriminating unit shown in FIG. 2.

Lastly, the operation of the control device 6 is described below in detail with reference to FIGS. 1 to 4. In particular, the operation of the control mode discriminating unit 62 is described in conjunction with the flow diagram of the operational steps to be executed during discrimination as shown in FIG. 3.

The control device 6 receives detected results as input signals from the respective sensors 12, 13, 14, 16, 17, 18, 23, 24 mounted on the vehicle 1. Upon receipt of these input signals, the road surface $\mu$-value estimating unit 60 calculates the wheel's rotating speeds and the slip ratios of the respective wheels 2, 2, 4, 4, the vehicle speed and the road surface $\mu$-estimated value R$\mu$ on the basis of the wheel's RPM signals WS and the acceleration signals WA.

Consecutively, the target drive power setting unit 61 sets the target drive power signal TD on the basis of the accelerator opening signal AO and the vehicle speed, etc. In a case where the vehicle 1 undergoes the slipped condition, the target drive power setting unit 61 sets the drive power, to be transmitted during the slipped condition, in the target drive power signal TD.

Further, the control mode discriminating unit 62 calculates the battery-power remaining capacity level SOC on the basis of the battery voltage signal BV and the battery current signal BC. Upon receipt of the atmospheric temperature signal AT, the road surface $\mu$-estimated value R$\mu$ and the battery temperature signal BT, the control mode discriminating unit 62 selects the lowest power remaining capacity level from the table according to the control mode discriminating matrix 62a. In a consecutive step S1, the control mode discriminating unit 62 compares the selected lowest remaining capacity level and the calculated battery-power remaining capacity level SOC.

In step S2, when the battery-power remaining capacity level SOC exceeds the lowest power remaining capacity level, the control mode discriminating unit 62 discriminates the control modes CM, such as the fuel saving mode, the low $\mu$-road running mode or the forced charging mode, from the table according to the control mode discriminating matrix 62a on the basis of the atmospheric temperature signal AT, the road surface $\mu$-estimated value R$\mu$ and the battery temperature signal BT. In contrast, in step S3, if the battery-power remaining capacity level SOC is below the lowest power remaining capacity level, the control mode discriminating unit 62 then settles the control mode CM into the forced charging mode. Next, the control mode discriminating unit 62 outputs the discriminated control mode CM to the control mode changeover unit 63.

Subsequently, upon receipt of the control mode signal CM, the control mode changeover unit 63 changes over the fuel saving mode control unit 64, the low $\mu$-road running mode control unit or the forced charging mode control unit 66. The fuel saving mode control unit 64 selects the drive power split ratio, for the sake of the fuel consumption on the basis of the target drive power signal TD and the vehicle speed etc., based on which the engine drive power signals TED and the motor drive power signals TMD are calculated. Upon receipt of the road surface $\mu$-estimated value R$\mu$, the target drive power signal TD and the vehicle speed, etc., the low $\mu$-road running mode control unit 65 selects the drive power split ratio, for the sake of the running stability, based on which the engine drive power signals TED and the motor drive signals TMD are calculated. Further, the forced charging mode control unit 66 calculates the amount of electric power to be charged into the battery 9 on the basis of the battery-power remaining capacity level SOC and also calculates the engine drive power signals TED and the motor drive signals TMD (the negative value) based on the amount of electric power to be charged.

Lastly, upon receipt of the engine drive power signals TED, the engine drive signal setting unit 67 settles the engine drive signals ED, which is then applied to the DBW driver 25. On the other hand, the motor demanded torque signal setting unit 68 settles the motor demanded torque signal MT on the basis of the motor drive signals TMD, which is outputted to the motor driver 15.

Thus, the DBW driver 25 is responsive to the engine drive signal ED to adjust the opening degree of the throttle valve 26 for thereby controlling the drive power output of the engine 3. Also, the motor driver 15 is responsive to the motor demanded torque signal MT to adjust the RPM and the rotational direction of the electric motor 5 for thereby controlling the drive power output of the electric motor 5. Further, the motor driver 15 is also responsive to the motor demanded torque signal MT to control the electric motor 5 for thereby controlling the charging operation of the electric motor 5. Also, during the deceleration of the vehicle 1, regenerative power output is produced with the electric motor 5 to be charged into the battery 9.

According to the control device 6, the presence of the capability of changing over the control mode in accordance with the control mode discriminating matrix 62a enables the engine drive power and the motor drive power to be set to respective desired values for the sake of fuel saving performance, the running stability and the battery performance. To this end, the control device 6 includes the atmospheric temperature, in order to more accurately estimate the road surface condition, which is added to the road surface $\mu$-estimated value as the parameter for discriminating the control mode. In order to more accurately estimate the battery performance, further, the control device 6 includes the battery temperature as the parameter for discriminating the control mode. With such a control device 6, further, in a case where the atmospheric temperature remains at the low level, the number of frequencies of forced charging operations is increased in dependence on the battery temperature to improve the performance of the battery 9 while enabling the improvement in the fuel saving performance of the vehicle when the atmospheric temperature remains in the normal temperature. In a case where the atmospheric temperature is at high level, the control device 6 functions to reduce the number of frequencies of the forced charging operations in dependence on the road surface $\mu$-estimated value, with a resultant improved fuel consumption. During running conditions of the vehicle when the atmospheric temperature remains at the normal level, a serious consideration is undertaken for the fuel consumption as important as possible in the control device 6, whereas when the atmospheric temperature is at low level, the control device 6 takes a serious consideration for the running stability of the vehicle.

It will now be appreciated from the foregoing description that the present invention is not limited to the illustrated embodiment discussed above and may be carried out in various modified forms.

For example, although the ranges of the atmospheric temperature, the road surface $\mu$-estimated value and the battery temperature have been settled to the respective values in the control mode discriminating matrix 62a, the present invention is not limited thereto and these values may be modified to respective suitable values in dependence on the different localities in weather and the battery performance. Further, although the atmospheric temperature, the road surface $\mu$-estimated value and the battery temperature have been described as having three different ranges including a high range, a medium range and a low range, these parameters may have other variety of ranges such as two ranges including a high range and a low range, four ranges or five ranges to be defined in more in detail.

Also, although the control mode has been described with reference to the fuel saving mode, the low $\mu$-road running mode and the forced charging mode, the control mode may have other additional operation modes or may have a control mode to allow the drive power split ratio to vary in a linear manner.

Further, although the temperature detection means of the electric storage means and the atmospheric temperature detection means have been described as comprising the temperature sensors of the thermistor type, the temperature detection means may be composed of any other temperature detection means.

Also, although the battery-power remaining capacity level has been described with reference to the rate (0 to 100%) of electric power charged in the battery 9, it may refer to the amount of electric power charged in the battery 9.

An important advantage of the control device for the front and rear wheel drive vehicle, as defined in claim 1, of the present invention involves the presence of the parameter including the atmospheric temperature to be used for enabling the changeover of the control modes with the control mode changeover means to allow the road condition to be estimated in a more reliable manner. Another important advantage of the present invention involves the presence of the parameter including the temperature of the electric storage means to be used for enabling the changeover of the control modes with the control mode changeover means to allow the performance of the electric storage means to be estimated in a more accurate manner. For the above reasons, it is possible for the control device of the present invention to estimate the number of frequencies of forced charging operation of the electric storage means at finely graded degrees in dependence on the road surface conditions and the battery performance. Another important advantage of the present invention concerns the presence of the drive power split ratio which is determined in the control device especially for the sake of fuel consumption to be maintained at a level as low as possible in response to the road surface conditions and the battery performance. Thus, it is possible for the control device to maintain the battery performance and the running stability, while providing an improved fuel consumption.

Another important advantage of the control device for the front and rear wheel drive vehicle, as defined in claim 2, of the present invention concerns the capability of estimating that, in a case where atmospheric temperature remains at a low level below a first given value, there are many probabilities in a decrease in the performance of the electric storage means for supplying electric power output for thereby allowing the lowest remaining capacity to be settled to a high level in dependence on the temperature of the electric storage means. This results in an increase in the number of frequencies of the forced charging operations of the electric storage means, increasing the power remaining capacity level of the electric storage means while increasing the temperature of the electric storage means.

Another important advantage of the control device for the front and rear wheel drive vehicle, as defined in claim 3, of the present invention concerns the capability of estimating that, in a case where atmospheric temperature remains at a normal level above a second given value, there is a few probabilities in a decrease in the performance of the electric storage means and there is no capability of encountering the low $\mu$-road due to the snow road for thereby allowing the lowest remaining capacity to be settled to a low level in dependence on the road surface $\mu$-estimated value. This results in a decrease in the number of frequencies of the forced charging operations of the electric storage means, thereby improving the fuel consumption provided that the road surface $\mu$-estimated value remains at the low $\mu$-value.

What is claimed is:

1. A control device for a front and rear wheel drive vehicle wherein one of a front wheel pair and a rear wheel pair is driven with an engine and the other one of said front wheel and rear wheel pairs is driven with an electric motor with electric power output produced by electric storage means, comprising:

drive condition detection means for detecting drive conditions of said front and rear wheel drive vehicle;

road surface frictional coefficient estimating means for estimating a road surface frictional coefficient;

atmospheric temperature detection means for detecting an atmospheric temperature;

temperature detection means for detecting a temperature of said electric storage means;

motor drive power calculation means for calculating a drive power of said electric motor on the basis of the drive conditions detected by said drive condition detection means and the road surface frictional coefficient estimated by said road surface frictional coefficient estimating means; and control mode changeover means for changing over control modes during calculation of the drive power of said electric motor on the basis of at least one of the atmospheric temperature detected by said atmospheric temperature detection means and the temperature of the electric storage means detected by said temperature detection means.

2. The control device for the front and rear wheel drive vehicle according to claim 1, wherein:

said drive condition detection means comprises power remaining capacity detection means for detecting a remaining capacity value of said electric storage means; and wherein, when the atmospheric temperature detected by said atmospheric temperature detection means is below a first given temperature level, said control mode changeover means settles the lowest power remaining capacity level in dependence on the temperature of said electric storage means detected by said temperature detection means and limits the drive power of said electric motor when the power remaining capacity level detected by said power remaining capacity detection means is below said lowest power remaining capacity level.

3. The control device for the front and rear wheel drive vehicle according to claim 1, wherein:

said drive condition detection means comprises power remaining capacity detection means for detecting a remaining capacity value of said electric storage means; and wherein, when the atmospheric temperature detected by said atmospheric temperature detection means exceeds a second given temperature level, said control mode changeover means settles the lowest power remaining capacity level in dependence on the road surface frictional coefficient estimated by said road surface frictional coefficient estimating means and limits the drive power of said electric motor when the power remaining capacity level detected by said power remaining capacity detection means is below said lowest power remaining capacity level.

* * * * *